(12) United States Patent
Favilli et al.

(10) Patent No.: US 9,346,008 B2
(45) Date of Patent: *May 24, 2016

(54) METHOD AND AN APPARATUS FOR SWEETENING AND DEHYDRATING A HYDROCARBON GAS, IN PARTICULAR A NATURAL GAS

(75) Inventors: Stefano Favilli, Rosignano Marittimo (IT); Luciano Scibola, Crema (IT)

(73) Assignee: SIME SRL, Rosignano Solvay (LI) (IT)

( * ) Notice: Subject to any disclaimer, the term of this patent is extended or adjusted under 35 U.S.C. 154(b) by 589 days.

This patent is subject to a terminal disclaimer.

(21) Appl. No.: 13/638,593

(22) PCT Filed: Mar. 29, 2011

(86) PCT No.: PCT/IB2011/000669
§ 371 (c)(1),
(2), (4) Date: Sep. 29, 2012

(87) PCT Pub. No.: WO2011/121423
PCT Pub. Date: Oct. 6, 2011

(65) Prior Publication Data
US 2013/0019530 A1    Jan. 24, 2013

(30) Foreign Application Priority Data
Mar. 29, 2010 (IT) .................... PI2010A0038

(51) Int. Cl.
*B01D 53/14* (2006.01)
*B01D 53/18* (2006.01)
(Continued)

(52) U.S. Cl.
CPC ............ *B01D 53/1462* (2013.01); *B01D 3/141* (2013.01); *B01D 53/1406* (2013.01);
(Continued)

(58) Field of Classification Search
CPC ........... B01D 53/1406; B01D 53/1425; B01D 53/1462; B01D 53/1475; B01D 53/18; B01D 53/263; B01D 2257/304; B01D 2257/504; B01D 2257/80; B01D 2256/24; B01D 3/141; C10K 1/085; C10K 1/102; C10K 1/12; C10K 1/16; C10L 3/102; C10L 3/106
USPC ...................... 95/230, 231, 235, 236; 96/243
See application file for complete search history.

(56) References Cited

U.S. PATENT DOCUMENTS 4,129,626 A * 12/1978 Mellbom ........................ 96/331
4,235,607 A * 11/1980 Kinder et al. .................... 95/223
(Continued)

FOREIGN PATENT DOCUMENTS

GB       2 111 852        7/1983
GB       2111852 A   *  7/1983    ............. B01D 47/14
(Continued)

*Primary Examiner* — Jason M Greene
(74) *Attorney, Agent, or Firm* — Ladas & Parry LLP

(57) ABSTRACT

A method and an apparatus for removing acid compounds (sweetening) and moisture (dehydration) from a hydrocarbon gas, in particular from a natural gas or from a refinery gas fraction or a gas of synthesis, by subsequent absorption operations using a sweetening liquid and a dehydration liquid. The method comprises a step of prearranging a sweetening chamber (51) and a dehydration chamber (52) within a vertical elongated container (50), each chamber defined by an inner partition wall (68) of said vertical elongated container (50), is wherein a gas transfer passageway (14) is provided between an upper outlet port of the sweetening chamber (51) and an inlet port of the dehydration chamber (52); the method also comprises steps of feeding the absorption liquid from the above into the two chambers and of feeding the gas from below into the sweetening chamber. The apparatus and the method according to the invention make it possible to reduce the overall dimensions of the treatment unit with respect to the prior art units, which is particularly relevant for off-shore installations.

25 Claims, 4 Drawing Sheets

(51) Int. Cl.
- *B01D 3/14* (2006.01)
- *C10K 1/08* (2006.01)
- *C10K 1/12* (2006.01)
- *C10K 1/16* (2006.01)
- *C10L 3/10* (2006.01)
- *B01D 53/26* (2006.01)

(52) U.S. Cl.
CPC ............... *B01D53/18* (2013.01); *C10K 1/085* (2013.01); *C10K 1/12* (2013.01); *C10K 1/16* (2013.01); *C10L 3/102* (2013.01); *C10L 3/106* (2013.01); *B01D 53/263* (2013.01); *B01D 2252/20421* (2013.01); *B01D 2252/20426* (2013.01); *B01D 2252/20431* (2013.01); *B01D 2256/24* (2013.01); *B01D 2257/304* (2013.01); *B01D 2257/504* (2013.01); *B01D 2257/80* (2013.01); *Y02C 20/20* (2013.01); *Y02P 20/152* (2015.11); *Y02P 70/34* (2015.11)

(56) References Cited

U.S. PATENT DOCUMENTS

| | | | | |
|---|---|---|---|---|
| 5,020,335 | A * | 6/1991 | Albers et al. | 62/271 |
| 5,486,318 | A * | 1/1996 | McKeigue et al. | 261/112.2 |
| 6,138,378 | A * | 10/2000 | Takashina et al. | 34/379 |
| 6,183,540 | B1 * | 2/2001 | Thonsgaard | 95/166 |
| 2002/0110511 | A1 * | 8/2002 | Klingspor et al. | 95/235 |
| 2008/0276803 | A1 * | 11/2008 | Molaison et al. | 95/178 |
| 2010/0322842 | A1 * | 12/2010 | Iijima et al. | 96/235 |
| 2011/0120308 | A1 * | 5/2011 | Dube et al. | 95/199 |
| 2013/0206005 | A1 * | 8/2013 | Sorhuus et al. | 95/114 |
| 2014/0005458 | A1 * | 1/2014 | Favilli et al. | 585/802 |
| 2014/0116252 | A1 * | 5/2014 | Carroni et al. | 95/211 |

FOREIGN PATENT DOCUMENTS

| | | | |
|---|---|---|---|
| WO | WO 85/01058 | | 3/1985 |
| WO | WO 98/32523 | * | 7/1998 ............ B01D 53/78 |
| WO | WO 2008/022426 | | 2/2008 |

* cited by examiner

Fig. 1
prior art
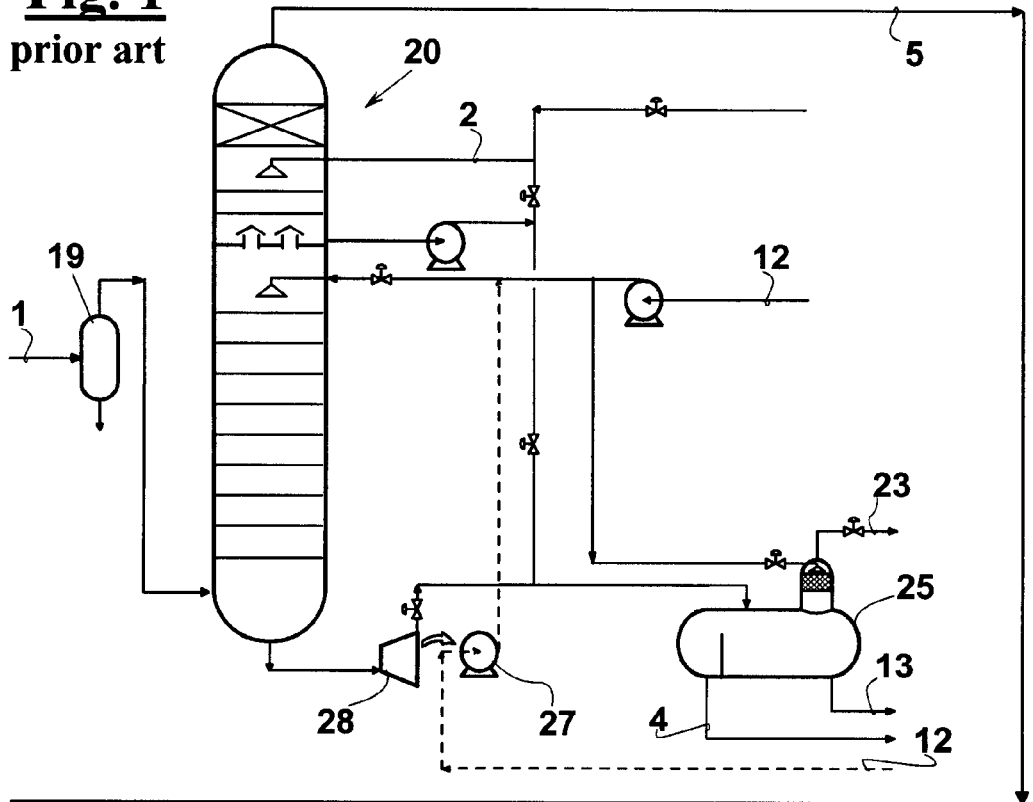
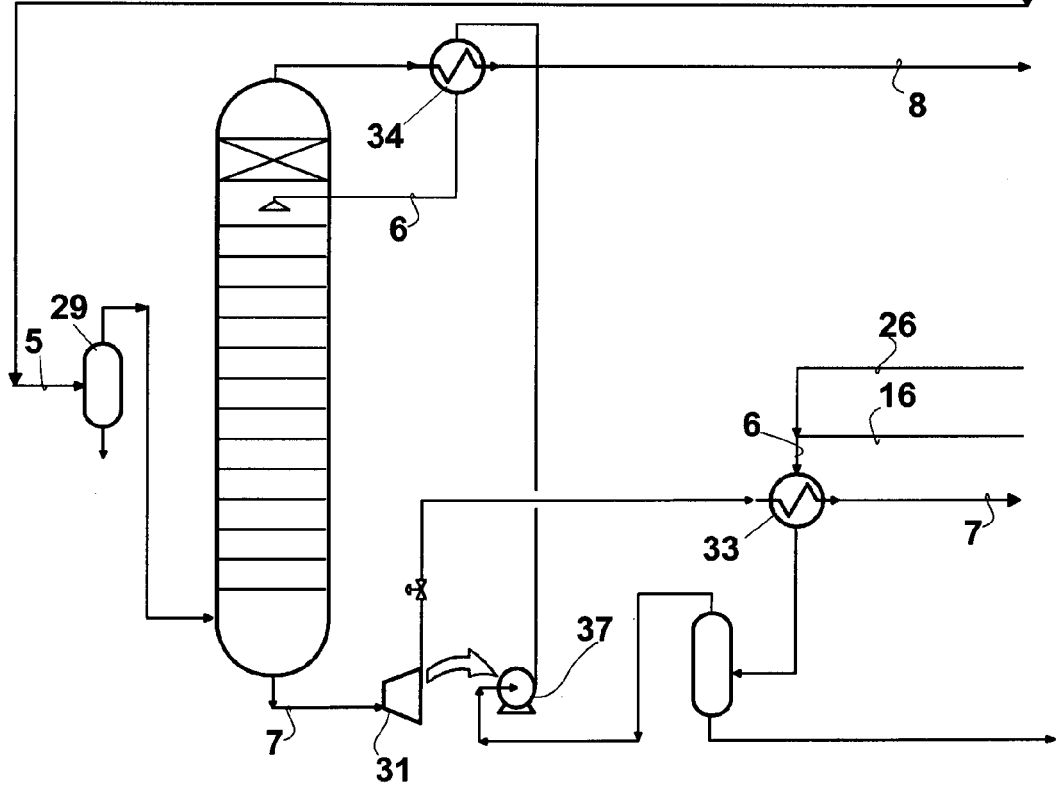

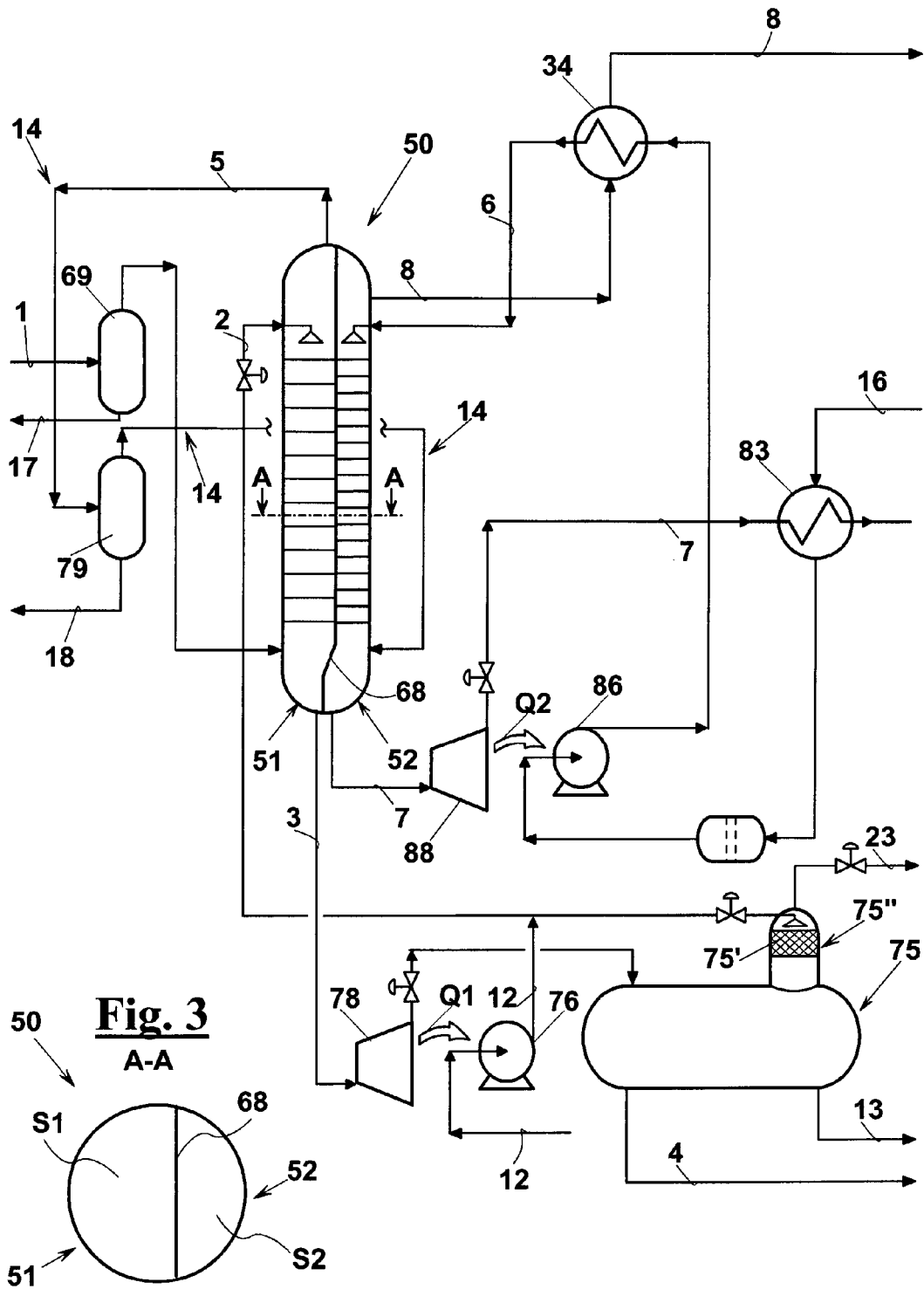

METHOD AND AN APPARATUS FOR SWEETENING AND DEHYDRATING A HYDROCARBON GAS, IN PARTICULAR A NATURAL GAS

This application is a 371 of PCT/IB2011/000669, filed on Mar. 29, 2011, which claims priority to Italian patent application number PI2010A000038, filed on Mar. 29, 2010.

FIELD OF THE INVENTION

The present invention relates to a method and to an apparatus for removing acid compounds (sweetening) and moisture (dehydrating) from a hydrocarbon gas, in particular from a natural gas as extracted from a well, by a succession of absorption operations in respective liquid means.

BACKGROUND OF THE INVENTION

Technical Problems

Raw natural gas, i.e. as extracted from wells, often contains acid compounds, in particular carbon dioxide and hydrogen sulfide, as well as water. The acid compounds, besides making the gas unsuited for a large number of uses, are often present in such an amount that, due also to presence of moisture, the gas becomes corrosive for the materials of the equipment to which the gas is to be piped. Furthermore, when the gas is expanded after the extraction, the moisture can cause formation of solids such as ice and hydrates of methane, ethane, and other hydrocarbons, which can damage and block ducts and passageways of the apparatus. Moisture present in the gas can also form stagnancy of water, typically within natural gas pipelines, where it also promotes acid corrosive action of $CO_2$ and $H_2S$, as well as other forms of corrosion, like electrochemical corrosion.

Such considerations also apply to other fuel gas mixtures, for example gas of light fractions from crude oil atmospheric distillation.

It is therefore often necessary to remove acid compounds and/or moisture from a hydrocarbon gas fuel, in particular from a natural gas immediately after extracting it from a well, i.e. from a natural gas field. To this purpose, two absorption processes of the gas into a liquid are carried out in succession in order to extract both alkaline substances and water from the gas.

According to the most diffused technique, the two absorption operations are carried out treating the hydrocarbon gas in respective absorption columns, as described hereinafter, with reference to FIG. 1.

In a typical sweetening and dehydration process, a hydrocarbon gas 1, for example a gas extracted from a well at a pressure that is normally set between 1.15 and 300 bar absolute, is subjected to a solid particulate and liquid gravity separation, within a separator 19 or in an equivalent apparatus. The gas treated this way flows upwards along a sweetening tower 20, where it comes into countercurrent contact with a sweetening liquid 2, i.e. a liquid that is adapted to withdraw the acid gas compounds, in particular $H_2S$ and $CO_2$, or even only $H_2S$. Sweetening liquid 2 is typically an aqueous solution of an alkaline substance that is adapted to absorb the acid components; for instance, it may be an aqueous solution of an inorganic base; in order to promote absorption. The absorption liquid may contain a component that is adapted to chemically bond the acid compounds extracted from the gas, for instance it may be a solution of one or more alkanolamines, which may be advantageously readily regenerable, i.e. it may be separated from adsorbed/chemically bound compounds and then re-used in the process: in particular, mono-, di- and triamines are used, such as monoethanolamine (MEA), diethanolamine (DEA), methyldiethanolamine (MDEA), activated MDEA, and other amines, as well as mixtures of amines. Sweetening liquid 2 may be a removal system like Selexsol®, Ifpexol®, Rectisol® and other systems that are available on the market.

In sweetening tower 20, sweetening liquid 2 turns into an exhausted sweetening liquid 3 that is expanded, for instance, in a turbine 28 or in an expansion valve, and then enters into a separation chamber 25 where a recovery takes place of a hydrocarbon oil fraction 4, derived from the gas, and of a water fraction 13, which is sent to a regeneration device for recovering the amine, for example to a distillation unit. Moreover, a hydrocarbon fuel gas fraction 23 can be recovered from separation chamber 25.

The regenerator recovers a regenerated sweetening liquid 12 which is treated, in particular is cooled, and fed into a top section of the sweetening chamber 20 by means of a pump 27, which may be associated with a turbine 28 for recovering energy from the expansion of exhausted liquid 3.

In sweetening tower 20, acid gas 1 turns into a wet sweetened gas 5, which contains acid substances, such as $H_2S$ and/or $CO_2$ in an amount that is lower than respective predetermined limit values, and which normally contains more moisture than a predetermined limit; the humidity may come from gas 1 and/or from an entrained sweetening liquid 12 or from a demineralized water used in a washing section, which is arranged downstream of the sweetening chamber for recovering the amine entrained by the gas.

Wet sweetened gas 5, which is at a pressure substantially equal to the feeding pressure, is subject to a first rough separation of the water entrained within a separator 29, and then flows upwards within a dehydration tower 30, where it comes into countercurrent contact with a hygroscopic dehydration liquid 6. The dehydration liquid is typically a readily regenerable liquid, for example a glycol, like triethylene glycol (TEG), preferably a high-purity triethylene glycol. By absorbing the moisture from wet gas 5, dehydration liquid 6 turns into an exhausted dehydration liquid 7 that is expanded, for instance, in a turbine 31 or in an expansion valve, and then is sent to a regeneration device, which recovers a regenerated dehydration liquid 16. A predetermined amount of make-up fresh dehydration liquid 26 is added to regenerated liquid 16 to form dehydration liquid 6 which is fed to column 30 by means of pump 37. A heat exchanger 33 provides transferring heat between regenerated dehydration liquid 16 and exhausted dehydration liquid 7.

In dehydration tower 30, wet sweetened gas 5 turns into a dry sweetened gas 8, which contains acid substances and moisture amounts lower than respective predetermined limit values, actually it contains substantially slight amounts of $H_2S$ and moisture; in absence of moisture, the presence of $CO_2$ is tolerated provided that it does not exceed commercially acceptable levels. A further heat exchanger 34 may be provided in which sweetened gas 8 exchanges heat with dehydration liquid 6, which is fed to dehydration tower 30 by adjusting its temperature some degrees above the gas temperature, in order to avoid any condensation of heavy hydrocarbons within the column.

The treatment units of the above described technique are remarkably bulky, due to the large diameter of the two absorption columns. For example, an amine sweetening process and a TEG dehydration process of 720000 Nmc/hr, may require 4.9 m diameter and 2 m diameter columns, respectively. This is particularly disadvantageous in case of a treatment units of natural gas that are installed on platforms, such as in the case of offshore wells, since the size of the platforms mainly depends upon the size of the columns and upon the related layout, safety and accessibility requirements of the piping.

Other drawbacks are high construction costs of the treatment units, due to the large thicknesses that are required for resisting to the gas pressure, the costs of large framework and lighting structures. Even operating and maintenance costs of such treatment units are important.

U.S. Pat. No. 6,183,540 describes a method for removing aromatic hydrocarbons from a gas stream and then sweetening the gas stream using an amine solution and then dehydrating it. The aromatic hydrocarbons have to be removed before the sweetening step to prevent them from being extracted by the amines solution along with $CO_2$ and $H_2S$, which complicates the regeneration of the amine solution, since they are harmful and since they are not substantially allowed to be included in the air emissions of the regeneration unit. Both the dehydration and the aromatic compounds removal is carried out by bringing the gas stream into contact with a glycol, typically with TEG. An apparatus is described which comprises a single vertical container that is horizontally divided into three sections where the gas flows upwards, i.e. into a lower aromatic glycol extraction section, a middle sweetening amine section and an upper glycol dehydration section; the glycol that leaves the upper dehydration section feeds by gravity the lower aromatic extraction section, which avoids the use of a transfer pump. Such an apparatus may attain a considerable height, therefore cannot reduce the overall transverse dimensions without increasing the height up to a value that could not be acceptable in some applications, for instance, in case of treatment plants that are installed on floating platforms. In particular, the proposed solution has no significant advantages in case of gases that do not contain a relevant amount of aromatic hydrocarbons, where the first glycol-extraction treatment is not necessary.

GB2111852 describes an apparatus for creating a contact between a gas and a liquid, where: an end-closed spherical or cylindrical outer external wall is provided; at least one separation element is vertically arranged within the external wall in order to form at least two distinct spaces within the external wall; a gas-liquid contact means is mounted in each space; apertures are provided for introducing and extracting a gas and/or a liquid into/from such spaces; the apparatus comprises furthermore, gas and/or liquid passages that parallely or serially connect such spaces. The apparatus is conceived to limit the height-to-diameter ratio, in particular for resisting seismic forces and also for simplifying the transport. In case of cylindrical external wall, the height-to-diameter ratio is lower than 7, and preferably is lower than 5. This is clearly due to the particular seismic conditions that may occur in Japan, whereas situations exist in which said ratio could be exceeded. This is obtained by a side-to-side arrangement of portions that would be arranged head-to-head, therefore a reduction of the tower inevitably increases the overall transverse dimensions, which is a disadvantage in case of installations on limited structures with limited spaces.

Such an apparatus is also not suitable for operations of sweetening/dehydration of a large number of gases that require such a treatment. For example, most of both active gas and active gas/oil fields produce a gas that contains a large amount of undesired substances, in particular, hydrogen sulfide: this is the case of the gas from the Caspian See (Kashagan) gas fields, which may contain $H_2S$ amounts up to 18-20% mol. In such cases, more complex sweetening towers are required, which are also provided with a large number of theoretical plates; in a not particularly difficult case of a gas from the above mentioned fields, up to 24 plates may be required, whereas a relatively mild treatment to obtain a gas not to be used in particular catalytic chemical processes, i.e. to one used in a process where a purity degree of about 5-6 ppm $H_2S$, may be sufficient, as in the case of a gas combustion in an industrial or home installation.

In this case, assuming a plate height of about 500 mm, the mass exchange zone may attain as such a height of about 12-15 meters, which may lead to a tower height of about 15-18 meters, comprising the head and bottom distribution devices, and the required cylindrical and bonnet portions. A maximum height-to-diameter ratio of 7:1, like GB2111852, would require a diameter of more than 2.1-2.6 m; such a value may be largely higher than what is required by the flow rates that can be reasonably treated in a sweetening unit. Even higher heights and, at the same pressure and flow rate conditions, even higher height-to-diameter ratios, may be required by treatments for obtaining a hydrocarbon gas that satisfies particular process requirements, as in case of a gas suitable for olefins production, where an $H_2S$ concentration of more than 1 ppm cannot normally be tolerated.

Furthermore, GB2111852 does not specifically refer to hydrocarbon gas sweetening/dehydration processes. It relates to processes in which a single treatment is performed, and the treatment liquid, for example a sweetening liquid, is fed parallelly. In an exemplary embodiment, a sweetening/regenerating process is shown which is carried out within contiguous chambers, where major problems may arise due to an undesired heat exchange and to unfavorable temperature profiles, since the sweetening temperature is normally far lower than the regeneration temperature of the absorption liquid, as in the case of the amines.

Furthermore, the gas and liquid passageways that are suggested by the above mentioned document, as shown in the drawings, would consist of ducts arranged within the external wall, which can disturb the gas and liquid flow and lead to a poor efficiency of the apparatus.

SUMMARY OF THE INVENTION

It is therefore a feature of the present invention to provide a method and an apparatus for sweetening and dehydrating a hydrocarbon gas, in particular an acid natural gas as it is extracted from a well, i.e. from a natural gas field, by absorption through a respective liquid absorption means, in order to reduce the overall dimensions of the treatment units, with respect to the prior art treatment units.

It is a particular feature of the present invention to provide such a method and such an apparatus, in order to limit the dimensions of platforms, in particular off-shore platforms, for sweetening and dehydration units of acid natural gas as it is extracted from a well, i.e. from a natural gas field.

It is, furthermore, a feature of the present invention to provide a method and an apparatus, for sweetening and dehydrating natural gas by absorption, in order to reduce the construction costs of the treatment units with respect to the costs involved by the known systems, and to reduce operating and maintenance costs.

These and other objects are achieved by a method for removing an acid compound and a moisture content from a hydrocarbon gas, in particular a gas extracted from a well, i.e. from a natural gas field, the acid compound and the moisture changing from respective predetermined initial concentrations to respective treated gas concentrations, the method comprising the steps of:

prearranging a vertical elongated container comprising a sweetening chamber and a dehydration chamber, the sweetening chamber separated from the dehydration chamber by an inner partition wall of the vertical elongated container, said inner partition wall extending in a substantially vertical way within the vertical elongated container, wherein:

the sweetening chamber has a first and a second inlet port and a first and a second outlet port, the first inlet port and the second outlet port arranged at an upper end of the sweetening chamber, the first outlet port and the second inlet port arranged at a lower end the of sweetening chamber;

the dehydration chamber has a third and a fourth inlet port, and a third and a fourth outlet port, the third inlet port and the fourth outlet port arranged at an upper end of the dehydration chamber, the third outlet port and the fourth inlet port arranged at a lower end of the dehydration chamber;

a gas transfer passageway is provided between the second outlet port of the sweetening chamber and the fourth inlet port of the dehydration chamber;

feeding a sweetening liquid through the first inlet port of the sweetening chamber, and extracting the sweetening liquid as a used sweetening liquid through the first outlet port of the sweetening chamber;

feeding a dehydration liquid through the third inlet port of the dehydration chamber and extracting the dehydration liquid as a used dehydration liquid through the third outlet port of the dehydration chamber;

feeding the hydrocarbon gas through the second inlet port of the sweetening chamber and extracting the hydrocarbon gas as a dry sweetened gas through the fourth outlet port of the dehydration chamber, in the sweetening chamber the sweetening liquid entraining the hydrocarbon gas, such that the sweetening liquid withdraws the acid compound from the hydrocarbon gas, the hydrocarbon gas turning into a sweetened gas in which the acid compound has the respective treated gas concentration, in the dehydration chamber the dehydration liquid entraining the sweetened gas, which comes from the sweetening chamber through the gas transfer passageway, such that said dehydration liquid withdraws moisture from the sweetened gas, the sweetened gas turning into a dry sweetened gas in which the moisture has the respective treated gas concentration.

Therefore, the method allows a considerable reduction of the overall transverse dimensions, for the same required passage cross sectional area, with respect to the case in which two distinct towers are used to carry out the sweetening and the dehydration. Accordingly, the area required for building the sweetening and dehydration unit can be considerably reduced. In particular, the invention allows a more advantageous space allocation on off-shore platforms and a reduction of the dimensions of the platforms.

For example, the method may be used for treating a natural gas extracted from a natural gas field or from an oil field.

The method may be advantageously used also for treating a refinery gas fraction, for example a gas from a crude oil atmospheric distillation unit, or a gas coming from a conversion unit, such as a desulphurization unit, a thermal or catalytic cracker unit, a visbreaker unit, a coker unit.

The method may be advantageously used also for treating a hydrocarbon gas produced in a petrochemical plant.

The method may be advantageously used also for treating a hydrocarbon gas produced in a chemical plant.

The method may be advantageously used also for treating a syngas produced by coal gasification.

The method may be advantageously used also for treating a hydrocarbon gas produced by a degradation and/or fermentation process, e.g. a biogas.

The method may be advantageously used also for treating a gas fuel to be burned in a gas flare.

In summary, the method may be advantageously used also for treating hydrocarbon gas that require in any case both/either a treatment for removing acid compounds, such as $CO_2$ and $H_2S$, and/or a treatment for removing water.

Advantageously, the method may be used for treating hydrocarbon gas in which the acid compound is hydrogen sulfide ($H_2S$) and the initial concentration is higher than 10 ppm, in particular said initial concentration is higher than 50 ppm by weight.

Advantageously, the method may be used for treating hydrocarbon gas in which the acid compound is $H_2S$ and the treated gas concentration, i.e. the sweetened gas concentration, is set between 5 and 6 ppm, more in particular the sweetened gas concentration is lower than 1 ppm, i.e. the method may be used for reducing the $H_2S$ concentration in the hydrocarbon gas to a value set between 5 and 6 ppm, more in particular to a value less than 1 ppm.

If only $CO_2$ is removed, the sweetening liquid may advantageously comprise bipotassium carbonate.

In particular in said sweetening chamber and/or in said dehydration chamber a pressure is maintained between the atmospheric pressure and 700 bar absolute, in particular between 1.15 bar absolute and 300 bar absolute, more in particular between 3 bar absolute and 300 bar absolute.

In particular, the sweetening liquid is a liquid that contains a substance adapted to physically and chemically or only physically bind with the acid compounds, in order to promote their absorption into the solution and therefore their removal from the gas stream.

Preferably, the substance that is adapted to bind with the acid compound is an organic base, for example a primary, secondary or tertiary amine, in particular selected between monoethanolamine (MEA), diethanolamine (DEA), methyldiethanolamine (MDEA) and a combination thereof, in which case the sweetening liquid is advantageously an aqueous solution of the organic base. In alternative, the sweetening liquid is typically a removal system such as Selexsol®, Ifpexol®, Rectisol®. In case only $CO_2$ is removed, the sweetening liquid may also advantageously comprise bipotassium carbonate.

Alternatively, or in addition to the above, the sweetening liquid may be a solution, of an inorganic base, typically an aqueous solution thereof, in particular a solution of sodium hydroxide.

The method may be used for treating a hydrocarbon gas in which the acid compound is $CO_2$ and the sweetened gas concentration is lower than 3%.

Advantageously, the treatment liquid is a dehydration liquid, i.e. a liquid that contains a hygroscopic substance. Such hygroscopic substance is typically a glycol, in particular triethylene glycol, preferably a glycol at a high purity degree, in particular a glycol at a purity degree higher than 99%, more in particular a glycol at a purity degree higher than 99.9%.

Advantageously, a step is provided of regenerating the used sweetening liquid, wherein at least one part of the used sweetening liquid is turned into a regenerated sweetening liquid that is joined with a predetermined amount of fresh make-up sweetening liquid, forming the sweetening liquid that is fed to the sweetening chamber.

If an alkanolamine solution is used as the sweetening liquid, the step of regenerating is preferably carried out by bringing the used sweetening liquid within a regeneration tower, after a step of expanding the used sweetening liquid, as extracted from the sweetening chamber.

Advantageously, the used sweetening liquid, after the expansion step, is subject to a step of oil fractions and/or fuel recovery.

Advantageously, a step is provided of regenerating the used dehydration liquid, wherein at least one part of the used dehydration liquid is turned into a regenerated dehydration liquid that is joined with an amount of fresh make-up dehydration liquid, which is required to form the dehydration liquid to be fed into the dehydration chamber.

When a glycol is used as the dehydration liquid, the step of regenerating is preferably performed by distillation, in particular by a single evaporation-condensation step.

Advantageously, a step is provided of feeding the sweetened gas to a washing section, a step of feeding a washing liquid to the washing section and a step of contacting the sweetened gas with the washing liquid within the washing section, in order to remove the sweetening liquid residues from the sweetened gas. The washing step is advantageous, in particular, if the sweetening treatment comprises using substances such as solutions of sodium hydroxide, in order to remove undesired traces of such substances from the gas.

The above mentioned objects, and other objects, are also achieved by an apparatus for removing an acid compound, in particular carbon dioxide and/or hydrogen sulfide, and a moisture content, from a hydrocarbon gas, in particular from a gas extracted from a well, i.e. from a natural gas field, reducing the concentration of the acid compound and of the moisture from respective predetermined initial concentrations to respective treated gas concentrations, the apparatus comprising:

a vertical elongated container having a height size-to-transversal size ratio, comprising a sweetening chamber and a dehydration chamber, the sweetening chamber separated from the dehydration chamber by an inner partition wall of the vertical elongated container, the partition wall extending in a substantially vertical way within the vertical elongated container, wherein:

the sweetening chamber has a first and a second inlet port and a first and a second outlet port, the first inlet port and the second outlet port arranged at an upper end of the sweetening chamber, the first outlet port and the second inlet port arranged at a lower end the of sweetening chamber;

the dehydration chamber has a third and a fourth inlet port and a third and a fourth outlet port, the third inlet port and the fourth outlet port arranged at an upper end of the dehydration chamber, the third outlet port and the fourth inlet port arranged at a lower end of the dehydration chamber;

a gas transfer passageway is provided between the second outlet port of the sweetening chamber and the fourth inlet port of the dehydration chamber;

a sweetening liquid feeding means for feeding a sweetening liquid through the first inlet port of the sweetening chamber, and a sweetening liquid extraction means for extracting the sweetening liquid as a used sweetening liquid through the first outlet port of the sweetening chamber;

a dehydration liquid feeding means for feeding a dehydration liquid through the third inlet port of the dehydration chamber, and a dehydration liquid extraction means for extracting the dehydration liquid as a used dehydration liquid through the third outlet port of the dehydration chamber;

a gas feeding means for feeding the hydrocarbon gas through the second inlet port of the sweetening chamber and a gas extraction means for extracting the hydrocarbon gas as a dry sweetened gas through the fourth outlet port of the dehydration chamber.

Therefore, the method allows a considerable reduction of the overall transverse dimensions, for the same required passage cross sectional area, with respect to the case in which two distinct towers are used to carry out the sweetening and the dehydration. Accordingly, the area required for building the sweetening and dehydration unit can be considerably reduced. In particular, the invention allows a more advantageous space allocation on off-shore platforms and a reduction of the dimensions of the platforms.

Advantageously, the dimension ratio (H/L) is higher than 7, more in particular is higher than 7.5, more in particular is larger than 8, more in particular is larger than 8.5, more in particular is larger than 9, more in particular is larger than 10.

Specific and high enough values of the height of the container, the diameter being the same, allow containing a number of plates, or a corresponding package height, that allows treating a gas containing acid components, in particular $H_2S$, at any concentration. This way, for instance, the apparatus can be used for treating a hydrocarbon gas in which the acid compound is hydrogen sulfide ($H_2S$) and the initial concentration ranges from a few percent fractions, in particular from 0.6% by weight, to a concentration of 18-20%, as in the case of Kashagan gas-Kazahstan, as in the case of natural gas or of gas associated with oil extraction, coming from a large number of active gas field. The number of plates or the package height that can be contained in the container can be also suitable for treatments to obtain a predetermined purity degree, for example a purity degree corresponding to a concentration in $H_2S$ that can be admitted in an industrial or home combustion plant, which is set between 5 and 6 ppm; the container may be high enough to house more plates or more packings, and/or a plurality of treatment and/or washing sections, which are useful when an even higher purity is required, for example a purity suitable for a chemical or catalytic process, as in case of the olefin synthesis, in which case a purity of about 1 ppm may be needed.

The sweetening chamber and the dehydration chamber have respective transverse sections with respect to a main direction of the elongated container; advantageously, the ratio between the cross sectional area of the dehydration chamber and the cross sectional area of the sweetening chamber is set between 0.1 and 0.45; in particular this ratio is set between 0.15 and 0.35; more in particular this ratio is set between 0.16 and 0.26.

The sweetening chamber and the dehydration chamber may be arranged, independently from each other, as plate chambers or packed chambers, where the packing chambers are preferably arranged as a structured packing. Plate towers allow a high flexibility, such as about 10/1 as the maximum-to-minimum capacity ratio, versus 5÷6/1 of the structured packed towers. Packed towers are advantageously used in installations on particular platforms, in which case the fluctuation of the columns does not ensure that a uniform plate liquid holdup is maintained. In the case of a sweetening liquid containing MEA, which is cheaper but is more prone to foul, since it is more prone to degradation than other sweetening liquids which also may foul, random packings may also be used, even if they are normally less efficient in terms of theoretical plate height, i.e. a higher packing height is required than in the case of a structured packing to obtain the calculated performances of a theoretical plate and, therefore, the performances of a real plate.

Advantageously, the apparatus comprises a used sweetening liquid regeneration device, which is adapted to transform at least part of the used sweetening liquid into a regenerated sweetening liquid. In this case, the apparatus advantageously comprises a means for adding to the regenerated sweetening liquid a make-up fresh sweetening liquid, in order to form the sweetening liquid necessary amount.

In particular, the used or exhausted sweetening liquid regeneration device is adapted to cause a decomposition of the complex compound that the amine forms with the hydrogen sulfide and/or with the carbon dioxide i.e. to desorb thermally or by pressure reduction said acid compounds from the adsorbing solution, and in order to transform back the used sweetening liquid into the regenerated sweetening liquid, freeing thus the acid compound from the amine of the adsorbing solution. This device may comprise a regeneration tower equipped with indirect heating.

Preferably, a means is provided for expanding the used sweetening liquid as extracted from the sweetening chamber, in particular a rotatable expansion means.

Advantageously, a compression means is provided to raise the pressure of the regenerated sweetening liquid up to a sweetening chamber operation pressure, the compression means associated with the rotatable expansion means for expanding the used sweetening liquid, in order to use a kinetic energy of the rotatable expansion means generated by the expansion of the sweetening liquid used. The rotatable expansion means of the used sweetening liquid may comprise a turbine and the regenerated sweetening liquid compression means may comprise a pump mechanically operated by the turbine.

In particular, the means for expanding the used sweetening liquid are associated with a means for recovering an oily fraction and/or a fuel fraction of the used sweetening liquid.

Advantageously, the apparatus comprises a used dehydration liquid regeneration device, that is adapted to transform at least one part of the dehydration liquid into a regenerated dehydration liquid. In this case the apparatus advantageously comprises a means for adding to the regenerated dehydration liquid a predetermined amount of a fresh, recovery or make-up dehydration liquid, for forming the necessary amount of dehydration liquid.

In particular, the used, i.e. exhausted, dehydration liquid regeneration device is adapted to carry out a step of heating and distillating the used dehydration liquid, in particular it is adapted to carry out a step of evaporation-condensation of the used dehydration liquid.

Preferably, a means is provided for expanding the used dehydration liquid as extracted from the dehydration chamber, in particular a rotatable expansion means.

Advantageously, a means is provided for compressing the regenerated dehydration liquid up to an operation pressure of the dehydration chamber, the compression means associated with the rotatable dehydration liquid expansion means, in order to use a kinetic energy of the rotatable expansion means that is generated by the expansion of the used dehydration liquid. The rotatable dehydration liquid expansion means may comprise a turbine and the regenerated dehydration liquid compression means may comprise a pump that is mechanically operated by the turbine.

In an exemplary embodiment, the sweetening chamber comprises a lower sweetening section and an upper sweetening section, a gas transfer passageway provided between the lower section and the upper section such that the hydrocarbon gas sequentially flows along the lower sweetening section and then along the upper sweetening section, and the sweetening liquid feeding means is arranged to feed a first sweetening liquid to the lower sweetening section and a second sweetening liquid to the upper sweetening section.

In particular the sweetening liquid feeding means is arranged to feed an amine-containing solution to the lower sweetening section.

In particular the sweetening liquid feeding means is arranged to feed a solution of an inorganic base to the upper sweetening section, for example an aqueous solution of sodium hydroxide.

Advantageously, the sweetening chamber comprises a washing section arranged above a sweetening section such that the sweetened gas flows along the washing section after flowing along the sweetening section, wherein the washing section is associated with a washing liquid feeding means for feeding a washing liquid distinct from the sweetening liquid.

In particular the washing liquid feeding means is adapted to feed water, preferably substantially demineralized water. In this case, the apparatus advantageously comprises a cold condensate collector to provide a substantially demineralized cold water. This treatment is useful for a gas that contains a large amount of hydrogen sulfide, i.e. sulfurated hydrogen $H_2S$; for example the treatment is useful for treating a process gas obtained from such operations as a steam-cracking of a heavy hydrocarbon-containing liquid, in particular diesel oil, or a gas obtained from a treatment of lighter fractions such as naphtha, which can contain a high amount of sulfurated compounds. Such sulfurated compounds, during the cracking step, lead to the formation of gaseous hydrogen sulfide. In such conditions, a simple treatment with caustic soda may be too expensive, which suggests performing a first sweetening step using an organic base such as an amine, followed by a second sweetening step using caustic soda and, advantageously, a final washing step, for example using demineralized water, in order to remove caustic soda, which may have been entrained by the gas stream while being treated.

A further sweetening section or, more in particular, a washing section, is advantageous if an accurate sweetening treatment is required, i.e. if a sweetened/treated gas purity is required, like that is necessary for a gas for a chemical or catalytic process, like olefin synthesis, in which case a purity of about 1 ppm may be required.

In particular, the sweetening section and/or the washing section may comprise a further treatment chamber that has a fifth and a sixth inlet port and a fifth and a sixth outlet port, the fifth inlet port and the sixth outlet port arranged at an upper end of the further treatment chamber, the fifth outlet port and the sixth inlet port arranged at an upper end of the further treatment chamber, a further gas transfer passageway provided between the sixth inlet port and the second outlet port of the sweetening chamber, the sixth outlet port and the fourth inlet port of the dehydration chamber connected to each other through the further gas transfer passageway, the further treatment chamber arranged to receive the sweetened gas from the sweetening chamber through the further gas transfer passageway through the sixth inlet port and a further treatment liquid through the fifth inlet port, in order to create a contact between the further treatment liquid and the sweetened gas in the further treatment chamber, and also arranged to cause the sweetened gas to pass into the dehydration chamber through the gas transfer passageway.

If a solution of an alkaline substance is chosen as the further sweetening liquid, the concentration of the alkaline substance, such as an amine, is advantageously higher than the concentration/purity degree of the solution that is used as the sweetening liquid in the main sweetening chamber.

Preferably, the further treatment chamber is defined by a portion of external wall of the vertical elongated container and is separated from the treatment chamber by an internal tray of the vertical elongated container, the tray arranged to receive the further used treatment liquid at the fifth outlet port, i.e. to keep a hold-up of liquid for controlling the column, the further gas transfer passageway made through the tray. In particular, the tray of the vertical container is a chimney tray.

BRIEF DESCRIPTION OF THE DRAWINGS

The invention will be made clearer with the following description of an exemplary embodiment thereof, exemplifying but not limitative, with reference to the attached drawings, in which FIG. 1 is a flow-sheet diagram of a process for sweetening and dehydrating an acid natural gas according to the prior art;

FIG. 2 is a flow-sheet diagram of a process for sweetening and dehydrating an acid natural gas according to an exemplary embodiment of the invention;

FIG. 3 diagrammatically shows a cross sectional view of a sweetening and dehydration tower;

DESCRIPTION OF PREFERRED EXEMPLARY EMBODIMENTS

Figure 6:
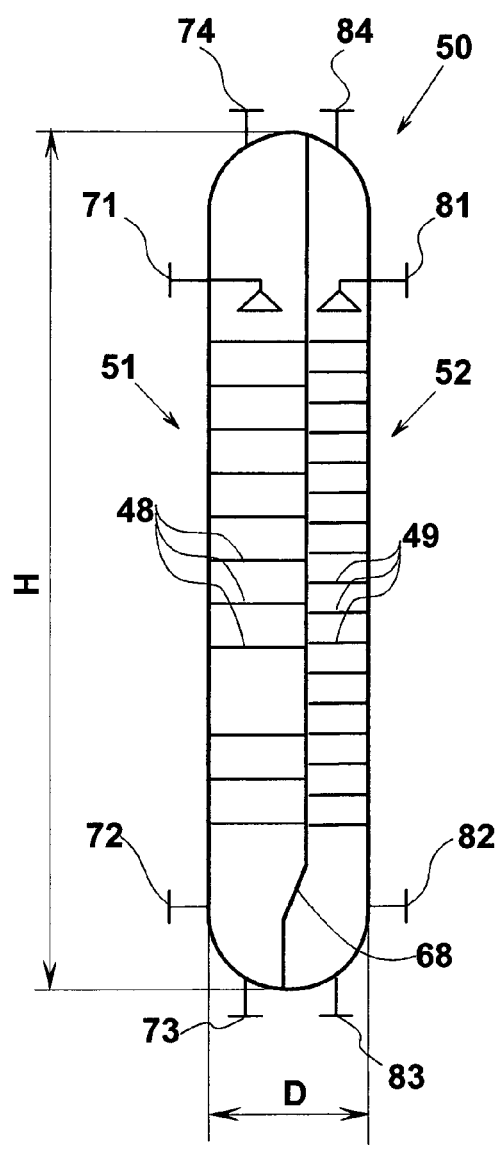
FIGS. 6 and 7 show diagrammatically two absorption and dehydration towers which are adapted to carry out the process according to the diagrams of FIGS. 2 and 4.

With reference to FIGS. 2 and 6, a method and an apparatus are described for sweetening and dehydrating an acid natural gas. In order to carry out such operations, a vertical sweetening and dehydration tower 50 is prepared, i.e. a container having a ratio H/D, referred to an overall height H and an overall transverse dimension D, the tower comprising an inner partition wall 68 that longitudinally extends within tower 50. Inner partition wall 68 defines within tower 50 a sweetening chamber 51 and a dehydration chamber 52 that are separated from each other by inner partition wall 68.

As diagrammatically shown in FIG. 3, in an advantageous exemplary embodiment for treating a typical acid natural gas that contains also moisture, inner partition wall 68 is arranged in such a way that the ratio between the cross sectional area of dehydration chamber 52 and the cross sectional area of sweetening chamber 51 is approximately 7/9 of the cross sectional area of chamber 52. This ratio may be selected responsive to the amount of the acid compounds to be removed from the raw gas; in particular, the higher the concentration, the higher the sweetening liquid flow rate, and therefore the larger the cross sectional area of sweetening chamber 51; in a portion of a plate tower, this is due to the higher cross sectional area that is required to make the downcomers. On the other hand, in the dehydration side, the dehydration liquid flow rate is not considerably affected by the moisture content of the raw gas, which, instead requires an accurate selection of the purity degree of the dehydration liquid to be achieved in the regeneration step.

Still with reference to FIG. 6, sweetening chamber 51 has a first and a second inlet port 71 and 72 and a first and a second outlet port 73 and 74; first inlet port 71 and second outlet port 74 are arranged at the upper end of sweetening chamber 51, whereas first outlet port 73 and second inlet port 72 are arranged at the lower end of vertical sweetening chamber 51.

Dehydration chamber 52 has a third and a fourth inlet port 81 and 82 and a third and a fourth outlet port 83 and 84; third inlet port 81 and fourth outlet port 84 are arranged at the upper end of dehydration chamber 52, whereas third outlet port 83 and fourth inlet port 82 are arranged at the lower end of vertical dehydration chamber 52.

As shown in FIG. 2, an acid gas 1, as extracted from a well, not shown, is subject to a gravity separation of solid particulate and liquid 17 within a separator 69. Liquid 17, which is separated in separator 69, is sent to a treatment unit, not shown. Acid gas 1 is then fed through second inlet port 72 into sweetening chamber 51, from which it is extracted, as a wet sweetened gas 5, through second outlet port 74. Into sweetening chamber 51 a sweetening liquid 2 is also supplied, through first inlet port 71, i.e. a liquid that is adapted to withdraw the acid compounds from gas 1, in particular $H_2S$, and possibly $CO_2$; typically, sweetening liquid 2 is an aqueous solution of an alkaline substance, which is adapted to bind with the acid components that are extracted from the gas, in order to promote the absorption process. Sweetening liquid 2 falls down through sweetening chamber 51, from which it is extracted as a waste, i.e. an exhausted sweetening liquid 3, via first outlet port 73.

In sweetening chamber 51, sweetening liquid 2 withdraws the acid substances from acid gas 1; this way, acid gas 1 turns into a wet sweetened gas 5, which contains an amount of acid substances that is lower than a respective predetermined limit, and a moisture content that is still higher than a respective predetermined limit; at the same time, sweetening liquid 2 turns into exhausted sweetening liquid 3. The sweetening process, which takes place within sweetening chamber 51, is carried out at substantially room temperature.

With the above described arrangement of inlet ports 71,72 and of outlet ports 73,74, for the sweetening liquid and for the gas, a countercurrent two-phase flow of gas 1.5 and liquid 2.3 is established within sweetening chamber 51. The scope of the invention also comprises the case in which both inlet/outlet ports 71,72,73,74 are arranged such that a concurrent flow is created of gas 1.5 and of liquids 2.3.

Exhausted sweetening liquid 3 is expanded, for example in a turbine 78, before entering a separation chamber 75, where an oily fraction 4 is separated from a water fraction 13 that is sent to a regeneration device, not shown, which returns a regenerated sweetening liquid 12, possibly added to a fresh make-up liquid, to be fed to sweetening chamber 51 by a first pump 76. In separation chamber 75 a fuel gas fraction 23 is also separated, which may be locally burned.

While passing through outlet port 74, wet sweetened gas 5 leaves absorption and dehydration tower 50 and flows along a gas transfer passageway 14, which consists of a duct, or a piping, that connects sweetening chamber 51 and dehydration chamber 52. Such a connection also comprises a separator, where droplets of sweetening liquid 18 are separated, which are entrained within chamber 51 and sent to a treatment and recovery unit, not shown.

Wet sweetened gas 5 is then fed through fourth inlet port 82 to dehydration chamber 52, from which it is extracted as a dry sweetened gas 8, through fourth outlet port 84. Into dehydration chamber 52, furthermore, through third inlet port 81, a dehydration liquid 6 is added, i.e. a hygroscopic liquid; dehydration liquid 6 is typically a glycol such as TEG. Dehydration liquid 6 falls down through dehydration chamber 52, from which it is extracted as a used or exhausted dehydration liquid 7, via outlet port 83.

In dehydration chamber 52, dehydration liquid 6 receives the moisture from wet sweetened gas 5, which accordingly turns into dry sweetened gas 8, which contains an amount of acid substances and moisture that is lower than respective predetermined limit values; at the same time, dehydration liquid 6 turns into exhausted dehydration liquid 7. The dehydration process, which takes place within dehydration chamber 52, is carried out at substantially room temperature.

With the above described arrangement of inlet ports 81,82 and of outlet ports 83,84, for the dehydration liquid and for the gas, a countercurrent two-phase flow of gas 5/8 and of liquid 6/7 is established within dehydration chamber 52. The scope of the invention also comprises the case in which both inlet/outlet ports 81,82,83,84 are arranged such that a concurrent flow is created of gas 5/8 and of liquids 6/7.

Exhausted dehydration liquid 7 is expanded, for example in a turbine 88, before entering a regeneration device, not shown, which returns a regenerated dehydration liquid 16 to be fed to dehydration chamber 52 along with a make-up amount 26 by a pump 86.

Figure 4:
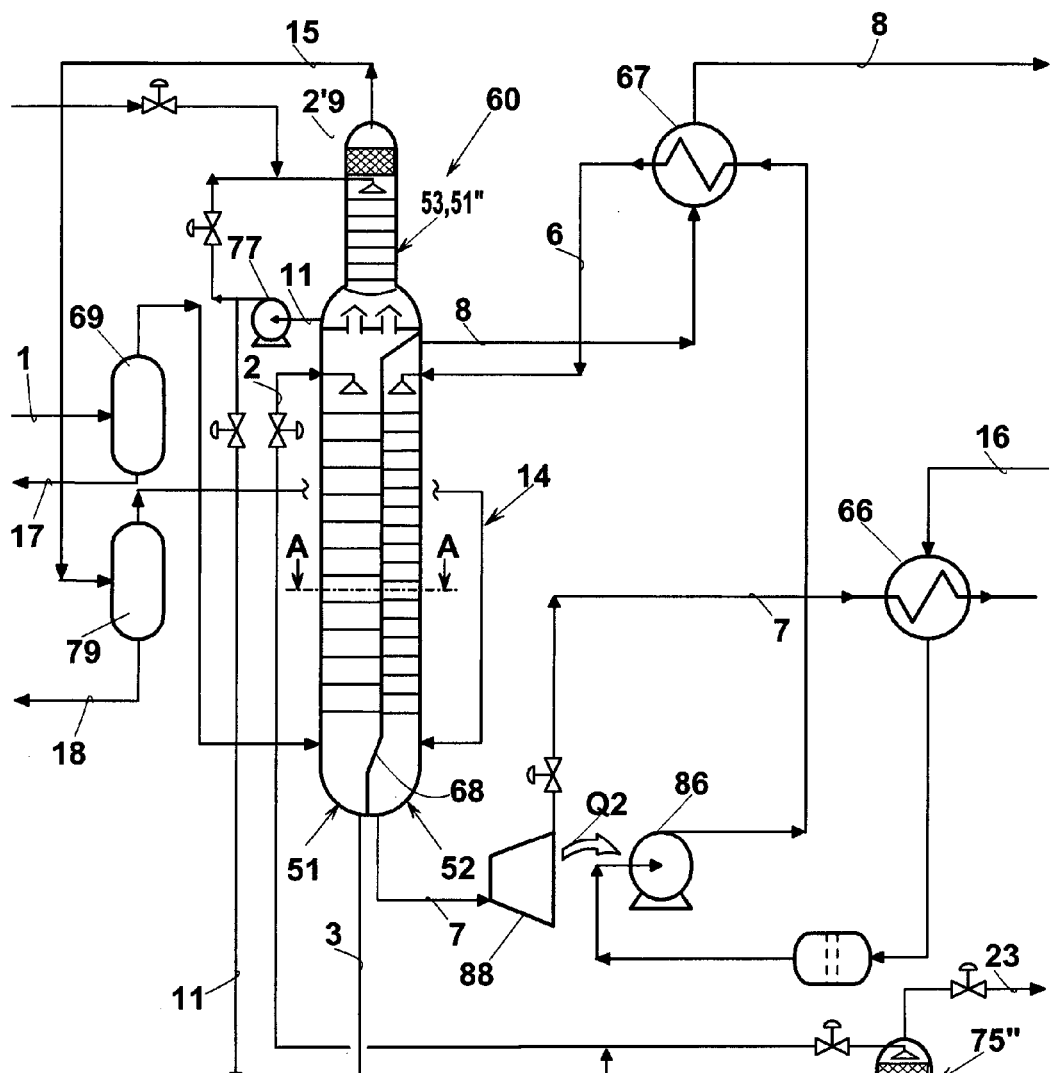
FIG. 4 is a flow-sheet diagram of a process for sweetening and dehydrating an acid natural gas according to another exemplary embodiment of the invention.
Figure 7:
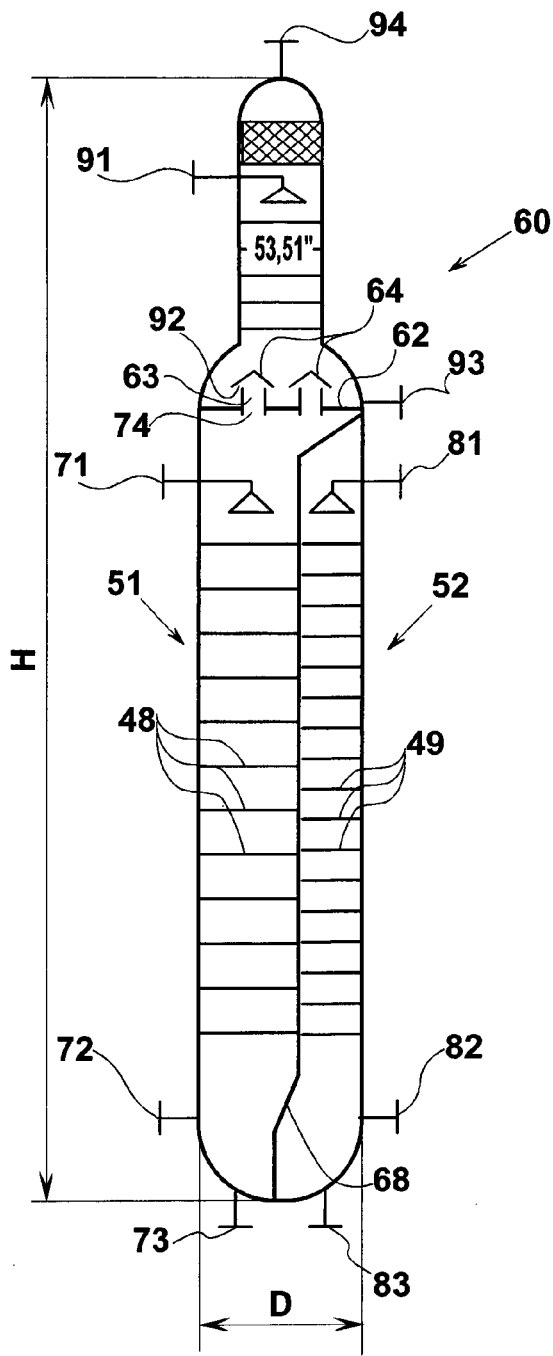

With reference to FIGS. 4 and 7, in another exemplary embodiment of the treatment and dehydration apparatus according to the invention, a treatment and dehydration tower 60 comprises internally a further vertical treatment chamber or section 51' 53, which may be a sweetening section or chamber 51", or a washing chamber or section 53. In a particular exemplary embodiment of FIG. 4, the further treatment chamber or section 51",53 is separated from chamber or sweetening section 51' by a separation tray 62 that is arranged within the external wall of tower 60 and is shown more in detail in FIG. 5. A passageway 63 is defined through separation tray 62 for sweetened or partially sweetened gas 5. Passageway 63 connects a fifth outlet port for liquid 93 of treatment chamber or section 51',53 with first outlet port 74 of sweetening chamber 51. Separation tray 62 may be a chimney tray, in which case transfer passageway 63 is defined within the chimney or the chimneys of separation tray 62. Wet and at least partially sweetened gas 5 which leaves chamber or sweetening section 51' is fed to a further treatment chamber 53 via the transfer passageway, i.e. through the first inlet port that becomes also a sixth inlet port 92, from which the gas is extracted as a further treated wet gas 15, via sixth outlet port 94.

The further treatment chamber or section may be a washing chamber 53. In this case, washing chamber 53 may be fed with a washing liquid 9, typically demineralised water, via a fifth inlet port 91. Washing chamber 53 allows removing a portion of sweetening liquid 2 that is fed to sweetening chamber 51 and is entrained by sweetened gas 5.

Advantageously, the demineralized water may be a cold condensed water, which may be available from a cold condensed water collector of the plant, not shown. The exhausted washing water is extracted through outlet port 93.

In another exemplary embodiment of the apparatus, the further treatment chamber or section may be a further sweetening section 51", which forms sweetening chamber 51 together with sweetening section 51'. In this case, into further sweetening section 51", still via fifth inlet port 91, a second sweetening liquid 2' is supplied that is adapted to withdraw the acid compounds from gas 1. In an exemplary embodiment, second sweetening liquid 2' is typically a solution of an alkaline substance that is similar to sweetening liquid 2, but is preferably at a higher concentration and/or at a higher purity degree than sweetening liquid 2, and falls down through sweetening chamber 53, and is extracted therefrom as a second used or exhausted sweetening liquid 11 via fifth outlet port 93. In another exemplary embodiment, second sweetening liquid 2" is an aqueous solution of an inorganic base, for example of sodium hydroxide.

In treatment chamber or section 51", 53, further sweetening liquid 2' or washing liquid 9, respectively, still withdraws from sweetened gas 5 acid substances, such as $H_2S$ and/or $CO_2$, or the entrained sweetening liquid. This way, wet sweetened gas 5 turns into treated (i.e. further sweetened or washed) wet gas 15, which contains an amount of entrained washing liquid, or of acid substances, that is lower than the content of wet sweetened gas 5 and lower than a respective predetermined limit; treated wet gas 15 contains however a moisture amount that is still larger than a respective predetermined limit; at the same time, further treatment liquid 2',9 turns into an exhausted treatment liquid 11 (i.e. for washing or further sweetening) that gathers on separation tray 62, in particular forming a liquid head of a height defined by the chimneys 64 of chimney tray 62. Exhausted treatment liquid 11 is extracted via fifth outlet port 93 and by means of a third pump 77 that transfers it, typically, to a regeneration device, not shown.

Further sweetening chamber 53 may have a cross sectional area lower or equal to the cross sectional area of main sweetening tower 51. In the exemplary embodiment shown in FIG. 4, further treatment chamber 51", 53 extends coaxially with respect to the remainder of sweetening and dehydration tower 60, i.e. it forms a minimum diameter upper portion of tower 60.

Washing chamber 53 may be a packed tower portion, preferably comprising a structured packing, or it may comprise a small number of valve or bell trays, in particular it may comprise two plates.

The apparatus comprises, furthermore, a first heat exchanger 66 where regenerated dehydration liquid 16 transfers heat to used dehydration liquid 7, which has become colder due to the expansion in a second turbine 81. While flowing along dehydration chamber 52, wet sweetened gas 5 is transformed into a dry sweetened gas 8, i.e. a gas containing acid substances and moisture amounts lower than the respective predetermined limit values, that are in practice substantially slight amounts. Dry sweetened gas 8 flows through a further heat exchanger 67 for further cooling the dehydration liquid fed to dehydration chamber 52.

Figure 5:
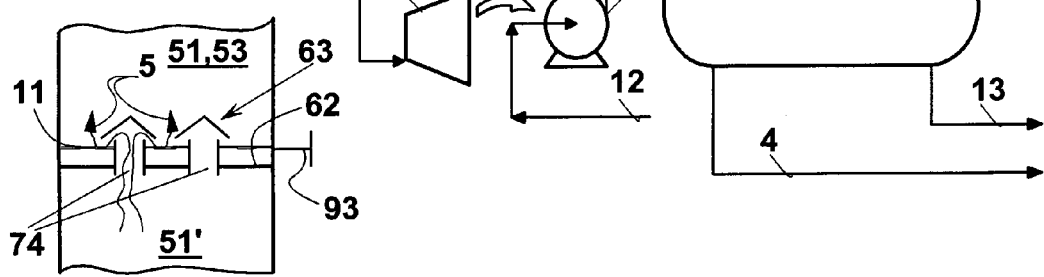
FIG. 5 is a detailed cross sectional view of a separation tray of the column of FIG. 4 or of FIG. 7.

In another exemplary embodiment, not shown, a sweetening and dehydration tower for an acid and wet gas, as above defined, comprises an inner partition wall that defines a sweetening zone and a dehydration zone within the sweetening and dehydration tower; the sweetening zone and the dehydration zone are in turn divided, respectively, into an upper sweetening or dehydration chamber and into respective lower separation chambers, the sweetening or dehydration chamber separated from the respective separation chamber by a separation tray, for example by a chimney tray separator of the type shown in FIG. 5. Moreover, the apparatus comprises a connection duct, outside the sweetening and dehydration tower, between an outlet port of the sweetening chamber and an inlet port of the separation chamber of the dehydration zone, for a stream of gas that has been treated in the sweetening chamber, i.e. for a wet sweetened gas.

The foregoing description is referred to a method and to an apparatus for sweetening and dehydrating a natural gas that contains acid compounds, but it can be applicable to other fuel gas that requires in any case a treatment for removing both an acid gaseous impurity, in particular carbon dioxide and hydrogen sulfide, and water, for instance it can be applicable to a gas associated to an oil field or to a refinery gas fraction, such as a gas produced by a crude oil atmospheric distillation, or to refinery fractions, such as a gas produced in a crude oil atmospheric distillation unit, a gas produced in a conversion plant (desulfuration, thermal and catalytic cracking, visbreaking, coking), other refinery gas, a gas produced in a petrochemical plant, more generally in a chemical plant, or in a coal gasification plant, or in plants where a degradation and/or fermentation process is exploited, for example a biogas plant, or a fuel gas to be burned in a gas flare.

The foregoing description of an embodiment of the method and of the apparatus according to the invention will so fully reveal the invention according to the conceptual point of view, so that others, by applying current knowledge, will be able to modify and/or adapt for various applications such embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology the is employed herein is for the purpose of description and not of limitation.

The invention claimed is:

1. A method for removing an acid compound and a moisture content from a hydrocarbon gas, said acid compound and said moisture changing from respective predetermined initial concentrations to respective treated gas concentrations, wherein said acid compound comprises $H_2S$, and an initial concentration of said $H_2S$ is higher than 10 ppm by weight, said method comprising the steps of:
prearranging a vertical elongated container having a dimension ratio between a height size and a transversal size and comprising a sweetening chamber and a dehydration chamber, said sweetening chamber separated from said dehydration chamber by a substantially vertical inner partition wall of said vertical elongated container, said inner partition wall extending in a substantially vertical way within said vertical elongated container, wherein:
said sweetening chamber has a first and a second inlet port, and a first and a second outlet port, said first inlet port and said second outlet port arranged at an upper end of said sweetening chamber, said first outlet port and said second inlet port arranged at a lower end of said sweetening chamber; said dehydration chamber has a third and a fourth inlet port, and a third and a fourth outlet port, said third inlet port and said fourth outlet port arranged at an upper end of said dehydration chamber, said third outlet port and said fourth inlet port arranged at a lower end of said dehydration chamber;
a gas transfer passageway is provided between said second outlet port of said sweetening chamber and said fourth inlet port of said dehydration chamber;
feeding a sweetening liquid through said first inlet port of said sweetening chamber, and extracting said sweetening liquid as a used sweetening liquid through said first outlet port of said sweetening chamber;
feeding a dehydration liquid through said third inlet port of said dehydration chamber, and extracting said dehydration liquid as a used dehydration liquid through said third outlet port of said dehydration chamber;
feeding said hydrocarbon gas through said second inlet port of said sweetening chamber, and extracting said hydrocarbon gas as a dry sweetened gas through said fourth outlet port of said dehydration chamber,
in said sweetening chamber, said sweetening liquid entraining said hydrocarbon gas, such that said sweetening liquid withdraws said acid compound from said hydrocarbon gas, said hydrocarbon gas turning into a sweetened gas in which said acid compound has said respective treated gas concentration,
in said dehydration chamber, said dehydration liquid entraining said sweetened gas, which comes from said sweetening chamber through said gas transfer passageway, such that said dehydration liquid withdraws moisture from said sweetened gas, said sweetened gas turning into a dry sweetened gas wherein, in said sweetened gas, said moisture has said respective treated gas concentration, wherein said dimension ratio is higher than 7.

2. A method according to claim 1, wherein said hydrocarbon gas is selected from the group consisting of:
a natural gas extracted from a natural gas field or from an oil field;
a refinery gas fraction, selected from the group consisting of:
a gas from a crude oil atmospheric distillation unit;
a gas produced in a desulphurization unit;
a gas produced in a thermal or catalytic cracker unit;
a gas produced in a visbreaker unit;
a gas produced in a coker unit;
a hydrocarbon gas produced in a petrochemical plant;
a hydrocarbon gas produced in a chemical plant;
a syngas produced by coal gasification;
a hydrocarbon gas produced by a degradation and/or fermentation process,
a gas fuel to be burned in a gas flare, said gas requiring a treatment for removing carbon dioxide and hydrogen sulfide, and water moisture.

3. A method according to claim 1, wherein in said sweetening chamber and/or in said dehydration chamber a pressure is maintained between the atmospheric pressure and 700 bar absolute.

4. A method according to claim 1, wherein said sweetening liquid is a solution of an organic base.

5. A method according to claim 1, wherein said sweetening liquid is a solution of an organic amine selected from the group consisting of monoethanolamine, diethanolamine, methyldiethanolamine, and a combination thereof.

6. A method according to claim 1, wherein said sweetening liquid is an aqueous solution of an inorganic base.

7. A method according to claim 1, wherein said dehydration liquid is a glycol.

8. A method according to claim 7, wherein said glycol has a purity degree higher than 99%.

9. A method according to claim 1, wherein a step is provided of feeding said sweetened gas to a washing section, in order to remove residues of said sweetening liquid from said sweetened gas.

10. An apparatus for removing an acid compound comprising hydrogen sulfide, and a moisture content, from a hydrocarbon gas, reducing the concentration of said acid compound and of said moisture from respective predetermined initial concentrations to respective treated gas concentrations, wherein an initial concentration of said $H_2S$ is higher than 10 ppm by weight, said apparatus comprising:
a vertical elongated container having a dimension ratio between a height size and a transversal size, comprising a sweetening chamber and a dehydration chamber, said sweetening chamber separated from said dehydration chamber by an inner partition wall of said vertical elongated container, said inner partition wall extending in a substantially vertical way within said vertical elongated container, wherein:
said sweetening chamber has a first inlet port and a second inlet port, as well as a first outlet port and a second outlet port, said first inlet port and said second outlet port arranged at an upper end of said sweetening chamber, said first outlet port and said second inlet port arranged at a lower end of said sweetening chamber;

said dehydration chamber has a third inlet port and a fourth inlet port, as well as a third outlet port and a fourth outlet port, said third inlet port and said fourth outlet port arranged at an upper end of said dehydration chamber, said third outlet port and said fourth inlet port arranged at a lower end of said dehydration chamber;

a gas transfer passageway is provided between said second outlet port of said sweetening chamber and said fourth inlet port of said dehydration chamber;

a sweetening liquid feeding means for feeding a sweetening liquid through said first inlet port of said sweetening chamber, and a sweetening liquid extraction means for extracting said sweetening liquid as a used sweetening liquid through said first outlet port of said sweetening chamber;

a dehydration liquid feeding means for feeding a dehydration liquid through said third inlet port of said dehydration chamber, and a dehydration liquid extraction means for extracting said dehydration liquid as a used dehydration liquid through said third outlet port of said dehydration chamber;

a gas feeding means for feeding said hydrocarbon gas through said second inlet port of said sweetening chamber and a gas extraction means for extracting said hydrocarbon gas as a dry sweetened gas through said fourth outlet port of said dehydration chamber, wherein said dimension ratio is higher than 7.

11. An apparatus according to claim 10, wherein said dimension ratio is higher than 7.5.

12. An apparatus according to claim 11, wherein said sweetening chamber and said dehydration chamber have respective transverse sections with respect to a main direction of said elongated container, and the ratio between the cross sectional area of said dehydration chamber and the cross sectional area of said sweetening chamber is set between 0.1 and 0.45.

13. An apparatus according to claim 11, wherein said sweetening chamber comprises a lower sweetening section and an upper sweetening section, and a further gas transfer passageway between said lower sweetening section and said upper sweetening section such that said hydrocarbon gas sequentially flows along said lower sweetening section and then along said upper sweetening section, and said sweetening liquid feeding means is arranged to feed a first sweetening liquid to said lower sweetening section and a second sweetening liquid to said upper sweetening section.

14. An apparatus according to claim 13, wherein said sweetening liquid feeding means is arranged to feed an amine-containing solution to said lower sweetening section, and said sweetening liquid feeding means is arranged to feed a solution of an inorganic base to said upper sweetening section.

15. An apparatus according to claim 11, wherein said sweetening chamber comprises a washing section arranged above a sweetening section such that said sweetened gas flows along said washing section after flowing along said sweetening section, wherein said washing section is associated with a washing liquid feeding means for feeding a washing liquid that is distinct from said sweetening liquid.

16. An apparatus according to claim 15, wherein said washing liquid feeding means is adapted to feed substantially demineralized water to said washing section.

17. An apparatus according to claim 15, wherein said washing section is a further treatment chamber defined by a portion of the external wall of said vertical elongated container and is separated from said sweetening chamber by a tray that is arranged within said vertical elongated container, said tray arranged to receive said further used treatment liquid at said fifth outlet port, said further gas transfer passageway made through said tray.

18. An apparatus according to claim 13, wherein said upper sweetening section is defined by a portion of the external wall of said vertical elongated container, and is separated from said sweetening chamber by a tray that is arranged within said vertical elongated container, said tray arranged to receive said further used treatment liquid at said fifth outlet port, said further gas transfer passageway made through said tray.

19. A method according to claim 1, wherein said sweetened gas concentration is lower than 1 ppm.

20. A method according to claim 4, wherein said organic base is selected from the group comprised of: primary amines, secondary amines, tertiary amines, or a mixture thereof.

21. A method according to claim 1, wherein said sweetening liquid is an aqueous solution of sodium hydroxide.

22. A method according to claim 7, wherein said glycol is triethylene glycol.

23. An apparatus according to claim 10, wherein said dimension ratio is higher than 8.

24. An apparatus according to claim 10, wherein said dimension ratio is higher than 9.

25. An apparatus according to claim 12, wherein said cross sectional area of said sweetening chamber is set between 0.16 and 0.26.

* * * * *